Patented Mar. 1, 1932

1,847,622

UNITED STATES PATENT OFFICE

WILLIAM S. MURRAY, OF UTICA, NEW YORK, ASSIGNOR TO ONEIDA COMMUNITY, LIMITED, OF ONEIDA, NEW YORK, A CORPORATION OF NEW YORK

PROCESS OF OBTAINING INDIUM AND ZINC FROM ORES CONTAINING THE SAME

No Drawing.   Application filed May 17, 1929. Serial No. 364,011.

The present invention relates to a new process for the recovery of indium, and zinc, from ores containing the same and is particularly advantageous for the treatment of such ores containing zinc and indium accompanied by the precious metals, silver and gold or either of them and by antimony, arsenic or an excessive proportion of iron.

It has been common in the art heretofore to employ electrolytic processes, for the recovery of zinc from zinc ores, but in practice it has been found that such electrolytic processes are too expensive to be applied to pure zinc ores and hence they are used only with mixed ores, which carry precious metals such as gold and silver in such quantities as will assist appreciably in paying the costs of operation.

In the electrolytic zinc processes heretofore employed a concentrate is prepared from the ore, as by crushing, grinding and flotation. The concentrate is then roasted to produce a calcine which is then leached with sulphuric acid, the leaching step being carried out in such a manner that the resulting solution is neutral or preferably slightly basic. In such a process, although the acid in the first stage of its action will dissolve the gold, possibly the silver and also any indium which may be present, the final conversion of the acid solution to a neutral or alkaline one, by the continual addition of calcine and an alkaline material results in precipitating the indium as well as precious metals. which thereafter pass off with the solids when the latter are separated from the liquid which is passed off to the zinc electrolyzing cells. In such a process the solids thus obtained are ground with acid and leached. Then the resulting solids and liquids are separated and the solids sent to the refinery for the recovery of the precious metals, copper and lead, if such metals be present in the starting materials. The acid liquid is subjected to the action of metallic zinc and sometimes metallic iron for the purpose of insuring that no metals other than zinc remain in the solution, thus purifying it for the electrolyzing steps. In order to insure the removal of any solids which may have accompanied the liquid, and of any precipitates formed therein, the liquid is subjected to a further separation step, and the solids are returned to the cycle at some preceding step of the process so that they will pass out of the cycle with the solids going to the refinery as hereinbefore described. The purified acid liquid high in zinc sulphate is returned to the cycle for leaching more calcine. In the process described, any indium which may be present in the ore is never recovered. It is precipitated into the solids during the leaching step because by the time this step is completed the solution is neutral or alkaline. When the solids are ground with the acid and leached, the indium is redissolved by the acid solution. When this is subjected to treatment with zinc and iron, the indium is precipitated and eventually goes back with the solids to a preceding stage of the cycle, finally going to the refinery where it is lost in the furnace process.

In my application, Serial No. 333,235, filed Jan. 11, 1929, I have described a process for recovering indium and zinc from ores containing the same, by maintaining the acidity of the solution when leaching the calcine and while separating the solids from the liquid, the indium being thereafter precipitated from the acid solution by treatment with metallic zinc. In working some zinc ores it is often advantageous to carry the leaching to the point where the solution becomes neutral or alkaline, in order to rid it of excess iron, antimony, or arsenic.

It is the object of the present invention to provide a process for the recovery of indium and zinc, separately, while allowing the leaching of the calcine to be terminated with the solution in a neutral or basic condition. In this way excess of iron as well as antimony or arsenic may be removed from the zinc salt solution at an early stage of the process, while also any gelatinous matter is rendered granular so that the zinc solution may be freed from it readily.

The invention will be described in its preferred embodiment as applied to an ore consisting principally of zinc but also containing gold, silver, antimony, arsenic, lead, iron and indium.

The ore is subjected to any suitable treatment to obtain a concentrate therefrom. While this may be done in various ways, the method in general use is to crush and grind the ore and subject it to a flotation process, with the result that a concentrate is obtained containing essentially all the values.

The concentrate is then roasted in an oxidizing atmosphere to produce oxids and sulphates of the metals while avoiding as much as possible the production of zinc-iron compounds. Hence high roasting temperatures are avoided. In the best practice the roasting temperature of the material is maintained between 400° C. and 600° C. and in no case is allowed to rise above 625° C.

The calcine from the roasting furnace is subjected to a leaching or dissolving process wherein it is brought in contact with an acid solution. Usually cell acid recovered from the electrolytic cells is employed, this being an aqueous solution of sulphuric acid, fresh acid, of course, being used at the initial starting of the plant, or added when necessary to increase the acidity of the leaching solution. In the present process the leaching may be carried out in a plurality of Pachuca tanks, having the usual air supply, the solution with its accompanying pulp flowing in series through the Pachucas, each of which receives a supply of calcine while the last Pachuca receives a charge of calcium carbonate and, if required, a charge of manganese dioxide. As the pulp and solution flow through the respective leaching Pachucas, the zinc is dissolved and the acidity of the solution is decreased step by step, so that usually the acidity of the fluid mixture entering the last Pachuca has an acidity of about 0.5 per cent. In the last Pachuca, the leaching liquid is rendered neutral or slightly basic.

From this last leaching Pachuca the fluid mixture of solution and pulp is advantageously passed to a settling tank. During the leaching process those of the metals soluble in the acid leaching solution are dissolved either completely or to a certain extent, so that up to the time the solution enters the last Pachuca is carries not only zinc but also iron, gold, silver, arsenic, antimony, and substantially all indium which may have been present in the calcine. Of course, there may be present some other metals, such as copper and cadmium if these existed in the original ore.

When the slightly acid solution is neutralized or rendered basic in the last leaching Pachuca, the indium is precipitated from the solution, together with other metals, such for example, as arsenic, antimony and some of the iron. Any gold or silver in the solution will also be precipitated.

The solids including the precipitates are separated from the liquid. In the usual practice, this separation step is carried out by means of classifiers, thickeners and filters, the later being usually of the drum suction type. The classifiers are particularly intended to separate the sand from the pulp and liquid, the sand going to a grinder, such as a ball mill, to be further comminuted and discharged to a suitable tank or series of tanks for treatment with acid, while the pulp and liquid are passed from the classifier to a thickener, which removes the pulp from the liquid and discharges it to the same tank or tanks which receives the discharge from the grinder, the liquid which consists principally of zinc sulphate solution passing to the electrolytic cells, after suitable purification steps for removal of metals such as copper or cadmium if these be present in the ore.

The solids which were sent to the tanks for acid treatment as hereinbefore mentioned, comprising pulp and finely comminuted sand from the grinder are subjected to the action of an acid solution. The tanks are usually Pachucas with air agitation and the acid is generally sulphuric acid. In this acid treatment all the metals which remained with the solids from the first calcine leaching steps, and which are soluble in acid, are dissolved. The acidity of the solution is maintained in order to avoid the precipitation of indium. The mixture of solids and liquids from this acid treatment is then suitably treated to separate the solids from the liquid, and the solids then go to the refinery for furnace treatment to recover any gold, silver, copper or lead which may be contained in such solids.

The acid liquid which contains in solution all the indium which can be recovered from the original calcine, and also some copper and perhaps some lead, is treated with zinc and sometimes also with iron whereby the said metals are precipitated. The precipitates and any accompanying solids are suitably separated from the liquid, and the latter, consisting principally of a solution of zinc sulphate, is returned to the first calcine leaching tanks. The solids are then treated to recover the indium separately from the other accompanying metals. One way of doing this is to subject the solids to the action of sulphuric acid, in order to dissolve the metallic values which can be dissolved by this acid, such for example as the indium, and, that part of the copper and lead which followed the solids and may be dissolved in the sulphuric acid.

In carrying out this step of the process a Pachuca tank of suitable size may be employed, and the strength of the acid solution and the length of time of treatment may be varied within a relatively wide range. For example, the strength of the acid solution may vary from .5% to 50%, and the time from four hours to 30 minutes. In general practice a solution having about 25% acid is very satisfactory and the solids may be subjected to its action for about 1½ to two hours. During the treatment of the solids with acid solution the heat generated by the reaction will raise the temperature of the solution very appreciably. This rise of temperature may be allowed to precede to its limit, no attempt being made to cool the solution.

When substantially all the soluble values in the solids have been dissolved, the contents of the Pachuca tank may then be discharged into an ordinary tank where the acidity of the solution may, if necessary, be adjusted either by the addition of acid or of alkali so as to have an acidity of about 3% to 5%. Thereafter hydrogen sulphide is passed into the tank in order to precipitate all those values which can be precipitated from an acid solution by hydrogen sulphide without precipitating any appreciable amount of indium. Indium is not precipitated by hydrogen sulphide from acid solution unless the treatment is carried too far. The values precipitated by this treatment are particularly gold, silver, and copper, and if properly carried out the indium remains in solution.

The solids, including the precipitates resulting from the hydrogen sulphide treatment are separated from the solution in any suitable way, but preferably in a filter press and are ready to be sent through the usual furnace refining processes for the recovery of the gold, silver and copper.

The solution is freed from any remaining hydrogen sulphide by any suitable step, as for example, by blowing it with air or by boiling it. Then the solution is sent to an electrolytic cell where the indium is plated out. This metal is practically pure, if all the steps have been carefully carried out. If, however, it be found to contain any undesirable accompanying impurities, it may be further refined by the well known methods. The sulphuric acid set free from the indium in plating it out, may be returned to the original calcine leaching Pachuca.

What is claimed is:

1. The process of separately recovering indium and zinc from ores containing the same associated with other metals, which consists in preparing a concentrate from such an ore, calcining the concentrate, leaching the calcine with sulphuric acid, neutralizing the solution, separating the solids from the solution while maintaining a non-acid condition of the solution, purifying the solution, electrolyzing it to recover the zinc, utilizing the cell acid to leach further calcine, acting on the said solids with sulphuric acid to dissolve the values soluble in said acid, separating the liquid from the solids, contacting the said liquid with metallic zinc whereby a precipitate containing indium is formed, separating this precipitate from the liquid, subjecting this precipitate to the action of sulphuric acid to dissolve the indium, treating the solution with hydrogen sulphide gas, then filtering the solution, expelling any excess hydrogen sulphide gas from the filtrate, plating out the indium from said filtrate, and utilizing the cell acid to leach further calcine.

2. The process of separately recovering indium and zinc from ores containing the same associated with other metals, which consists in preparing a concentrate from such an ore, calcining the concentrate, leaching the calcine with sulphuric acid, neutralizing the solution, separating the solids from the solution while maintaining a non-acid condition of the solution, acting on the said solids with sulphuric acid to dissolve the values soluble in said acid, separating the liquid from the solids, contacting the said liquid with metallic zinc whereby a precipitate containing indium is formed, separating this precipitate from the liquid, subjecting this precipitate to the action of sulphuric acid to dissolve the indium, treating the solution with hydrogen sulphide gas, then filtering the solution, expelling any excess hydrogen sulphide gas from the filtrate, plating out the indium from said filtrate, and utilizing the cell acid to leach further calcine.

In testimony whereof, I have hereunto set my hand.

WILLIAM S. MURRAY.